United States Patent [19]

Sagebiel

[11] 4,088,339
[45] May 9, 1978

[54] TRAILER HITCH ASSEMBLY FOR PICKUP TRUCK

[76] Inventor: Dan Sagebiel, Rte. 7, Llano, Tex. 78643

[21] Appl. No.: 764,659

[22] Filed: Feb. 1, 1977

[51] Int. Cl.² .......................................... B62D 53/06
[52] U.S. Cl. .............................................. 280/423 R
[58] Field of Search ............... 280/423 R, 511, 415 R, 280/438 R

[56] References Cited

U.S. PATENT DOCUMENTS

| | | | |
|---|---|---|---|
| 3,392,992 | 7/1968 | Baker et al. | 280/423 R |
| 3,874,702 | 4/1975 | Hall | 280/423 |

FOREIGN PATENT DOCUMENTS

| | | | |
|---|---|---|---|
| 2,521,835 | 4/1975 | Germany | 280/438 R |

*Primary Examiner*—Joseph F. Peters, Jr.
*Assistant Examiner*—John A. Pekar
*Attorney, Agent, or Firm*—Berman, Aisenberg & Platt

[57] ABSTRACT

A trailer hitch which may be easily installed and removed from the bed of a pickup truck. The trailer hitch assembly includes a pair of retaining brackets which are mounted inside the individual wheel wells of the truck and are also secured to the truck frame. The retaining brackets each have a mounting aperture formed therein which cooperate with a pair of locking pins that are movably disposed at each end of a main support member that extends in use between the outside walls of the wheel wells in the bed of the pickup truck. The locking pins are spring-loaded and may be selectively actuated by a lever so as to render the main support member easily installable and removable from the bed of the truck. Centrally positioned on the main support member is a ball coupler for receiving the ball socket of a gooseneck type trailer hitch. Positioned transversely to the main support member at each end thereof are a pair of braces which conform in shape to the outer periphery of the wheel wells to secure the main support member both transversely and longitudinally in such a fashion that the stress imparted by the trailer will be distributed across the entire frame of the truck.

7 Claims, 4 Drawing Figures

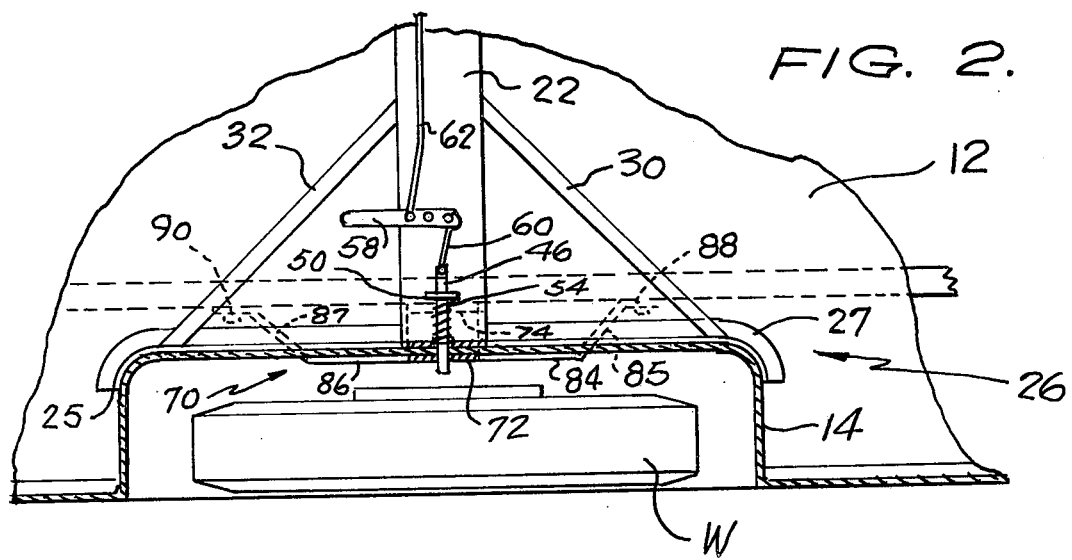
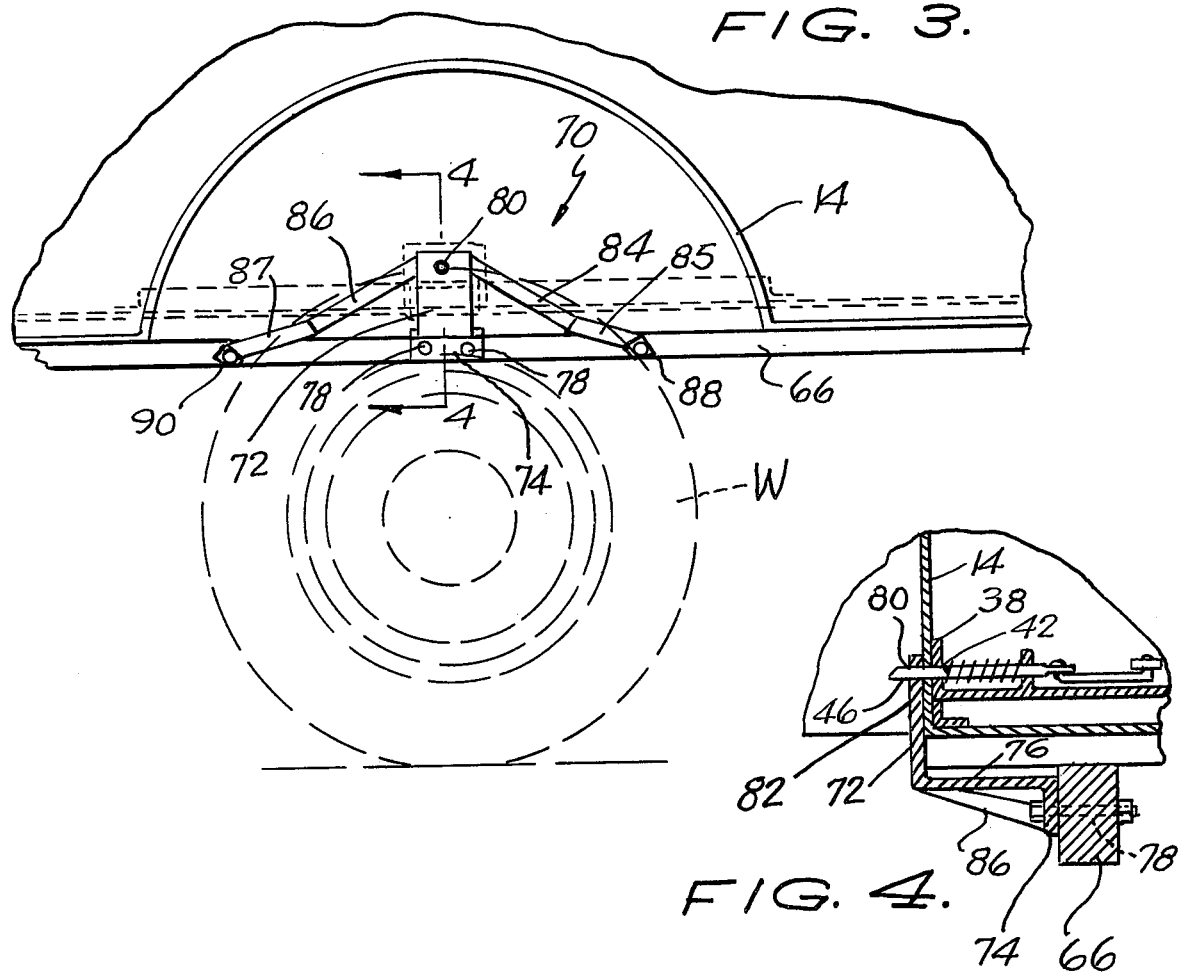

TRAILER HITCH ASSEMBLY FOR PICKUP TRUCK

BACKGROUND OF THE INVENTION

1. Field of the Invention

The present invention is related to trailer hitches and, more particularly, is directed towards a trailer hitch assembly which may be selectively and simply installed in and removed from the bed of a pickup truck.

2. Description of the Prior Art

Many different types and designs of trailer hitches are known in the art. I am aware of several previous designs of trailer hitches which have been advanced with the idea of providing a structure which is mountable in the bed of a pickup truck to which a gooseneck type of trailer hitch may be connected.

A typical prior art design is exemplified by the construction taught in U.S. Pat. No. 3,392,992 issued to Baker, et al. This patent teaches a cross structure 23 which extends between and is pivotally supported on a pair of end frames 21 and 22 which are mounted to the bed of a pickup truck. I have found, however, that the Baker, et al. device suffers from several deficiencies, not the least of which concerns the pivotal mounting of the structure 23 to the frame members 21 and 22 by means of a pair of pivot shafts 48 and 39. More particularly, I have found that the pivotal mounting provides a less than fully supportive means for mounting the assembly to the truck. In addition, removal of the hitch assembly is not easy to accomplish. Further, even after removing the hitch-coupling portion of the assembly, the mounting structure remains in the bed of the pickup truck which, in turn, takes up valuable cargo space by reducing the floor area in the bed of the truck to what otherwise might be available.

Other prior art U.S. Pat. Nos. in this general area of which I am aware include: 3,874,702; 3,889,978; 3,893,713; 3,820,821; 3,826,516; and 3,837,675. Each of these structures, however, are either too complex, too costly to manufacture, too difficult for a single individual to manipulate, are not easily removable and installable, and/or require unduly complicated mounting hardware which constitute space-consuming obstructions when the hitch portion of the assembly is demounted.

Furthermore, I have found that the prior art structures in general do not provide good weight distribution of the trailer load over the truck. Most of the prior art structures, in fact, concentrate the stress on the bed of the pickup truck, and fail to provide any means for distributing the stress to other points in the vehicle to provide for greater ease in operation and less wear and tear on the pulling vehicle.

OBJECTS AND SUMMARY OF THE INVENTION

It is therefore a primary object of the present invention to provide a new and improved removable trailer hitch for pickup trucks which overcomes all of the deficiencies noted above with respect to prior art devices.

Another object of the present invention is to provide a novel and unique trailer hitch assembly which may be easily and quickly installed in and removed from the bed of a pickup truck.

A still further object of the present invention is to provide a novel design of a trailer hitch for receiving gooseneck type trailer couplers which provides a greatly improved weight distribution of the stress over the frame of the vehicle pulling the load.

An additional object of the present invention is to provide a unique trailer hitch assembly which is quickly and easily installed and removed from the bed of a pickup truck, which is simple in design, economical to manufacture, and which, when removed from the truck, leaves no obstacles in the normal cargo space of the truck.

Another object of the present invention is to provide a removable trailer hitch for a pickup truck which includes means for rigidly coupling same to the bed of the truck, means for distributing the stress evenly to the frame of the truck, and means for easily and simply installing and removing the assembly.

The foregoing and other objects are attained in accordance with one aspect of the present invention through the provision of a trailer hitch assembly that is adapted to be removably mounted within the bed of a pickup truck. The pickup truck normally includes a pair of oppositely disposed wheel wells whose outer walls normally protrude into the standard cargo space of the bed of the truck. The hitch assembly comprises a main support member which is adapted to be extended transversely between the outside walls of the pair of wheel wells. Connected to the approximate mid-point of the main support member is means for coupling a gooseneck hitch in the form of a standard hitch ball. Retaining means are positioned on the inside wall of each of the wheel wells for securing the main support member across the bed of the pickup truck during use. Means are mounted on the main support member for selectively securing it to the retaining means. In a preferred embodiment, the selective securing means comprises a pair of pins which are horizontally disposed one at either end of the main support member. Means are provided for moving the pins between a lock position and a release position, said pin moving means comprising a lever pivotally mounted to the main support member, a pair of connecting rods each of which is pivotally mounted between one end of the pins and the lever, and means for biasing the pins into normal locking engagement with the retaining means. The retaining means in a preferred mode comprises a plate member positioned on the inside wall of each wheel well, the plate member having a pin-receiving aperture formed therein. Means are further provided for connecting the plate member to the frame of the pickup truck whereby the stresses imparted to the main support member will be distributed across the frame of the truck. More particularly, the means for connecting the plate member to the frame of the truck comprises a bracket that integrally extends from the plate member and has means for bolting same to the frame of the truck, and a pair of brace members that extend laterally from each side of the plate member, the distal ends of the brace members also being secured to the frame of the truck.

In accordance with yet other aspects of the present invention, a pair of side braces are also provided which are connected one to each end of the main support member and which extend perpendicularly thereto. Each of the side braces conforms in shape to that of the outer wall of the respective wheel well to which it is adjacent and serve to prevent lateral and transverse movement of the main support member once secured in the bed of the truck.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which:

FIG. 2 is a top view, partly in section, of the preferred embodiment illustrated in FIG. 1 and taken along line 2—2 thereof;

FIG. 3 is a side view of the preferred embodiment illustrated in FIG. 2; and

FIG. 4 is an enlarged sectional view of the preferred embodiment illustrated in FIG. 3 and taken along line 4—4 thereof.

DETAILED DESCRIPTION OF THE PREFERRED EMBODIMENT

Figure 1:
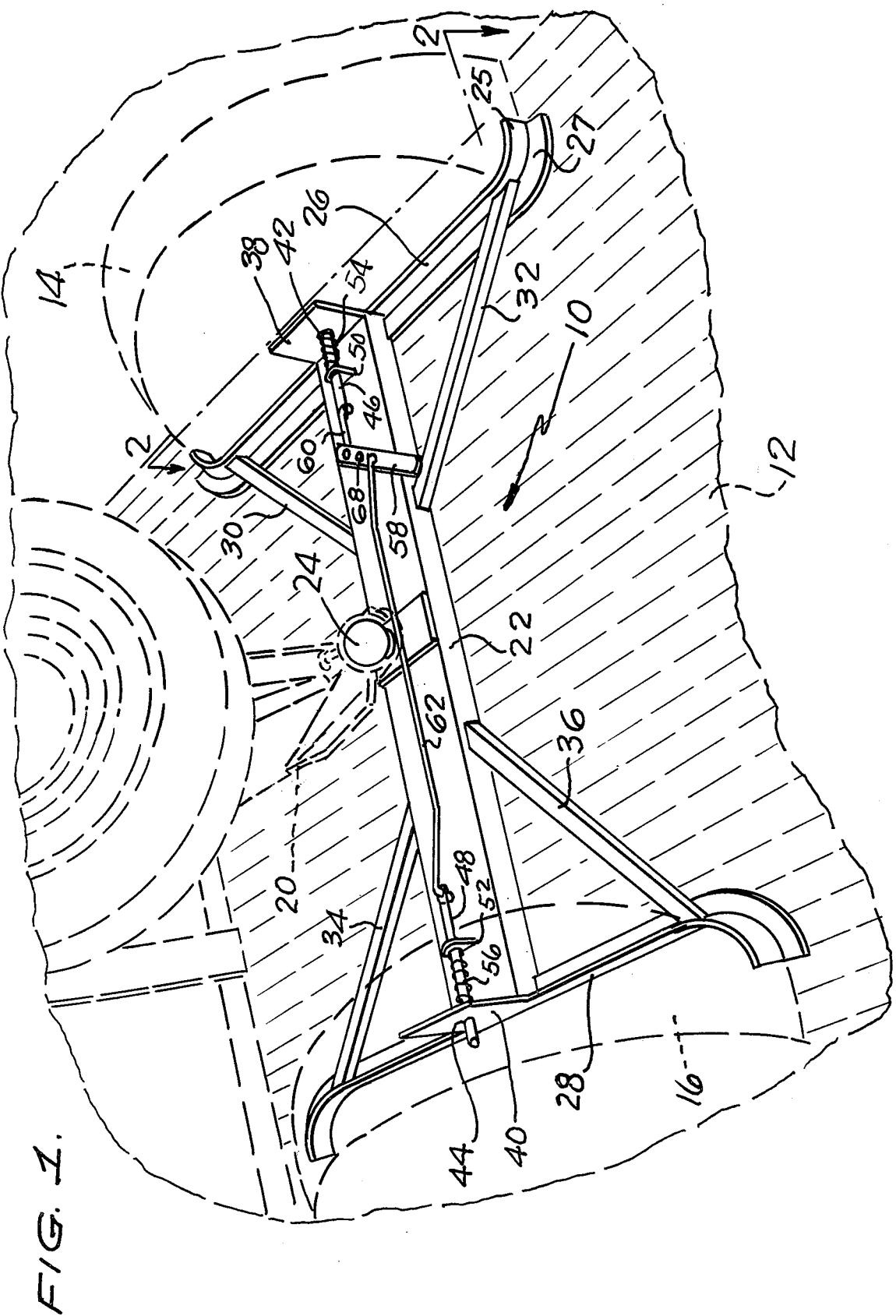
FIG. 1 is a perspective view illustrating a preferred embodiment of the present invention as installed in the bed of a pickup truck.

Referring now to the drawings, wherein like reference numerals indicate identical or corresponding parts throughout the several views, and more particularly to FIG. 1 thereof, there is illustrated a preferred embodiment of the removable trailer hitch of the present invention which is indicated generally by the reference numeral 10. The removable trailer hitch 10 of the present invention is shown mounted in the bed 12 of a pickup truck between the side wheel wells 14 and 16 thereof. A gooseneck type hitch coupler is indicated in dotted outline and by the reference numeral 20 and is shown as it would be in an operative position connected to the ball 24 of the preferred embodiment of the hitch 10 of the present invention.

The removable trailer hitch 10 of the present invention comprises a main transverse support member 22 which extends from the outside wall of one wheel well 14 to the outside wall of the other wheel well 16. Support member 22 may be comprised, for example, of a 6 inch channel iron, and is designed so as to distribute the stress transmitted by coupler 20 across the bed 12 of the truck. A gooseneck coupling ball 24 is positioned centrally along the upper surface of support member 22.

A pair of side frame members 26 and 28 are positioned one at either end of the main transverse support member 22. The side frame members 26 and 28 extend in a direction substantially perpendicular to the support member 22 and are preferably connected at their midpoint to the ends thereof. Side frame member 26 is comprised of a vertical member 25 and a horizontal member 27, members 25 and 27 meeting one another at right angles. Member 28 is of a similar construction, and both side frame members 26 and 28 are contoured so as to fit the outer surface of respective wheel wells 14 and 16. The curved ends of frame members 26 and 28 help in the stress distribution and, at the same time, provide convenient positioning means as well as means for assisting in preventing longitudinal movement of the hitch 10 in the bed 12 of the truck.

Side frame member 26 may be further secured in position by a pair of diagonal braces 30 and 32 which extend between the vertical member 25 and the downwardly depending flange of the support member 22. Similarly, side frame member 28 may be provided with a pair of support struts or diagonal braces 34 and 36.

At each of the ends of the main transverse support member 22 are positioned a pair of substantially planar side plates 38 and 40 which serve as further means for bracing the hitch 10 against lateral movement between wheel wells 14 and 16. Side plates 38 and 40 each have an aperture 42 and 44 centrally positioned therein for slidably receiving a pair of mounting and locking pins 46 and 48, respectively. Pins 46 and 48 are, in turn, slidably mounted within a pair of upstanding guide ears 50 and 52, respectively.

Positioned about pin 46 is a spring 54, one end of which is biased against stationary guide ear 50, the other end of which is connected to the distal end of pin 46 to bias same in its locked position. Similarly, pin 48 is provided with a biasing spring 56 that extends between stationary guide ear 52 and plate 40.

Each of the pins 46 and 48 may be withdrawn from their respective apertures 42 and 44 in plates 38 and 40, respectively, by means of a lever 58 which is pivotally mounted as at 68 to the main transverse support member 22. Pin 46 is coupled to lever 58 by means of a coupling rod 60 which is pivotally connected between one end of pin 46 and lever 58. Similarly, pin 48 is coupled to lever 58 by means of a coupling rod 62.

Referring now to FIGS. 2 through 4, means for retaining the removable trailer hitch 10 in the bed of the pickup truck are provided in the form of a pair of frame brackets, each of which is mounted on the inside of the respective wheel wells. Indicated in FIGS. 2 and 4 by reference numeral 70 is one such frame bracket which is provided for securing the side frame member 26 to the wheel well 14. The frame bracket 70 is comprised of a bracket plate 72 which has an aperture 80 formed therein which is co-axially aligned with aperture 42 in plate 38 for slidably receiving the pin 46 of hitch assembly 10. As illustrated in FIG. 4, a further aperture 82 must also be provided in the wheel well wall 14 to complete the pin-receiving structure.

The frame bracket 70 also includes a mounting flange 74 which is connected to the plate 72 by a horizontal connecting member 76 (FIG. 4). Mounting flange 74 is secured to the frame 66 of the pickup truck by means of a pair of mounting bolts 78. Further, extending from plate 72 are a pair of support braces 84 and 86 which include rearwardly extending connecting member 85 and 87 the ends of which are respectively secured to the frame 66 of the truck by a pair of bolts 88 and 90. In this fashion, the frame bracket 70 is not only secured to the wheel well, but provides a means for distributing the stress imparted by the gooseneck trailer 20 to the frame 66 of the truck. Further, mounting of the frame bracket 70 on the inside of the wheel well leaves the bed 12 of the truck totally free of obstructions when the support member 22 is removed to permit the truck to be utilized for normal hauling functions. This is accomplished without any major alterations to the truck bed structure, other than the provision of the frame bracket assemblies 70, one within each wheel well.

The transverse support member 22 is illustrated in FIG. 1 in its locked position whereby pins 46 and 48 extend through their respective apertures to be locked within their respective frame brackets positioned within the wheel well 14 and 16. To remove the main support member 22, lever 58 is pivoted about its pivot pin 68 in a counter-clockwise fashion as illustrated in FIG. 1 in order to draw the pins 46 and 48. against the force of springs 54 and 56, from within their locking apertures in the bracket assmblies 70. The entire trailer hitch assembly 10 may then be easily removed to leave a clear and unobstructed bed 12 of the truck.

Obivously, numerous modifications and variations of the present invention are possible in light of the above teachings. It is therefore to be understood that within the scope of the appended claims, the invention may be practiced otherwise than as specifically described herein.

I claim as my invention:

1. A trailer hitch assembly adapted to be removably mounted within the bed of a pickup truck, said pickuup truck including a pair of oppositely disposed wheel wells each having an outside wall adjacent said bed and an inside wall adjacent a respective rear wheel of said truck, and a frame, said hitch assembly comprising:
   a main support member having movable pin means at the ends thereof and adapted to be extended in use transversely between the outside walls of said pair of wheel wells in the bed of said pickup truck;
   means for coupling a gooseneck hitch connected to the approximately midpoint of said main support member;
   retaining means positioned on the inside wall of each of said wheel wells for securing said main support member across the bed of said pickup truck in use, said retaining means comprising a plate member positioned on the inside wall of said wheel well and having a pin-receiving aperture formed therein; and
   means for connecting said plate member to the frame of said pickup truck.

2. The trailer hitch assembly as set forth in claim 1, wherein said movable pin means comprises a pair of pins which are horizontally disposed one at each end of said main support member, and means for moving said pins between a lock position and a release position.

3. The trailer hitch assembly as set forth in claim 2, wherein said pin moving means comprise a lever pivotally mounted to said main support member and a pair of connecting rods each of which is pivotally mounted between one end of one of said pins and said lever.

4. The trailer hitch assembly as set forth in claim 3, further comprising means for biasing said pins into normal locking engagement with said retaining means.

5. The trailer hitch assembly as set forth in claim 4, further comprising a pair of apertured guide plates for each of said pins, said biasing means comprising a spring positioned about said pin between said guide plates.

6. The trailer hitch assembly as set forth in claim 1, wherein said means for connecting said plate member to the frame of said pickup truck comprises a bracket integrally extending from said plate member and having means for bolting same to the frame of said truck, and a pair of brace members extending laterally from each side of said plate member, the distal ends of said brace members being secured to said frame of said truck.

7. The trailer hitch assembly as set forth in claim 1, wherein said wheel wells extend into said bed of said truck from the sidewalls thereof, and further comprising a pair of side braces connected one to each end of said main support memer and extending transversely thereof, each of said side braces conforming in shape to that of the outside wall of the respective wheel well for preventing lateral and transverse movement of said main support member once secured in said bed of said pickup truck.

* * * * *